United States Patent
Aronson et al.

(10) Patent No.: US 7,236,085 B1
(45) Date of Patent: Jun. 26, 2007

(54) LOCK WITH REMOTELY ACTIVATED LOCKOUT FEATURE

(75) Inventors: Glen L. Aronson, Vancouver, WA (US); John Wollam, Vancouver, WA (US)

(73) Assignee: Smartlok Systems, Inc., Vancouver, WA (US)

( * ) Notice: Subject to any disclaimer, the term of this patent is extended or adjusted under 35 U.S.C. 154(b) by 72 days.

(21) Appl. No.: 10/174,714

(22) Filed: Jun. 18, 2002

(51) Int. Cl.
  - H04Q 9/00 (2006.01)
  - E05B 65/52 (2006.01)
  - E05G 1/00 (2006.01)

(52) U.S. Cl. .............. 340/5.64; 340/5.73; 340/825.17; 340/825.31; 70/278.1; 70/38; 70/63; 109/45; 109/46; 109/47; 109/48; 109/49

(58) Field of Classification Search ............ 340/5.64, 340/5.73, 825.17, 825.31; 70/278.1, 38, 70/63; 109/45, 46, 47, 48, 49
See application file for complete search history.

(56) References Cited

U.S. PATENT DOCUMENTS

| | | | | |
|---|---|---|---|---|
| 4,204,635 A | * | 5/1980 | Hofmann et al. | ........... 235/382 |
| 4,575,719 A | * | 3/1986 | Bertagna et al. | ............. 340/5.9 |
| 4,609,780 A | * | 9/1986 | Clark | .................... 379/102.06 |
| 4,766,746 A | * | 8/1988 | Henderson et al. | ......... 340/5.73 |
| 4,811,578 A | | 3/1989 | Masoncup et al. | .......... 70/38 B |
| 4,864,115 A | * | 9/1989 | Imran et al. | ................. 235/492 |
| 4,914,732 A | | 4/1990 | Henderson et al. | .... 340/825.17 |
| 4,947,163 A | | 8/1990 | Henderson et al. | .... 340/825.31 |
| 5,212,644 A | * | 5/1993 | Frisch | ........................ 705/418 |
| 5,219,386 A | * | 6/1993 | Kletzmaier et al. | ........... 70/277 |
| 5,222,076 A | * | 6/1993 | Ng et al. | ..................... 375/223 |
| 5,392,025 A | * | 2/1995 | Figh et al. | ................... 340/547 |
| 5,406,257 A | * | 4/1995 | Saito | .......................... 340/542 |
| 5,525,964 A | | 6/1996 | Ming | ......................... 340/542 |
| 5,587,702 A | * | 12/1996 | Chadfield | .................... 340/542 |
| 5,727,405 A | | 3/1998 | Cromwell | ................... 70/38 B |
| 5,791,172 A | | 8/1998 | Deighton et al. | .............. 70/63 |
| 5,815,557 A | * | 9/1998 | Larson | ...................... 340/5.64 |
| 5,850,753 A | * | 12/1998 | Varma | ........................ 70/278.7 |
| 6,047,575 A | | 4/2000 | Larson et al. | .............. 70/278.1 |
| 6,100,802 A | | 8/2000 | Adams | .......................... 340/542 |
| 6,130,605 A | * | 10/2000 | Flick | ..................... 340/426.23 |
| 6,297,725 B1 | | 10/2001 | Tischendorf et al. | ...... 340/5.64 |
| 6,344,796 B1 | * | 2/2002 | Ogilvie et al. | ........... 340/568.1 |
| 6,420,971 B1 | * | 7/2002 | Leck et al. | ................. 340/542 |
| 2003/0107498 A1 | * | 6/2003 | Drennan | ................ 340/825.28 |

* cited by examiner

Primary Examiner—Jeffery Hofsass
Assistant Examiner—Scott Au
(74) Attorney, Agent, or Firm—Law Office of Timothy E. Siegel; Timothy E. Siegel

(57) ABSTRACT

A method for controlling access to a storage unit owned by an owner, wherein a renter has access to the storage unit unless the owner receives the legal right to deny the renter access to the storage unit and decides to do so. In this method, the storage unit is secured by a lock that is, at least in part, controlled by the renter. A remotely controllable lockout assembly, however, is capable of over locking the storage unit so that the renter can no longer gain entry when the lockout assembly is activated. The method includes remotely controlling the lockout assembly to deny the renter access to the unit when the owner receives the legal right to deny the renter access to the storage unit and decides to do so.

13 Claims, 3 Drawing Sheets

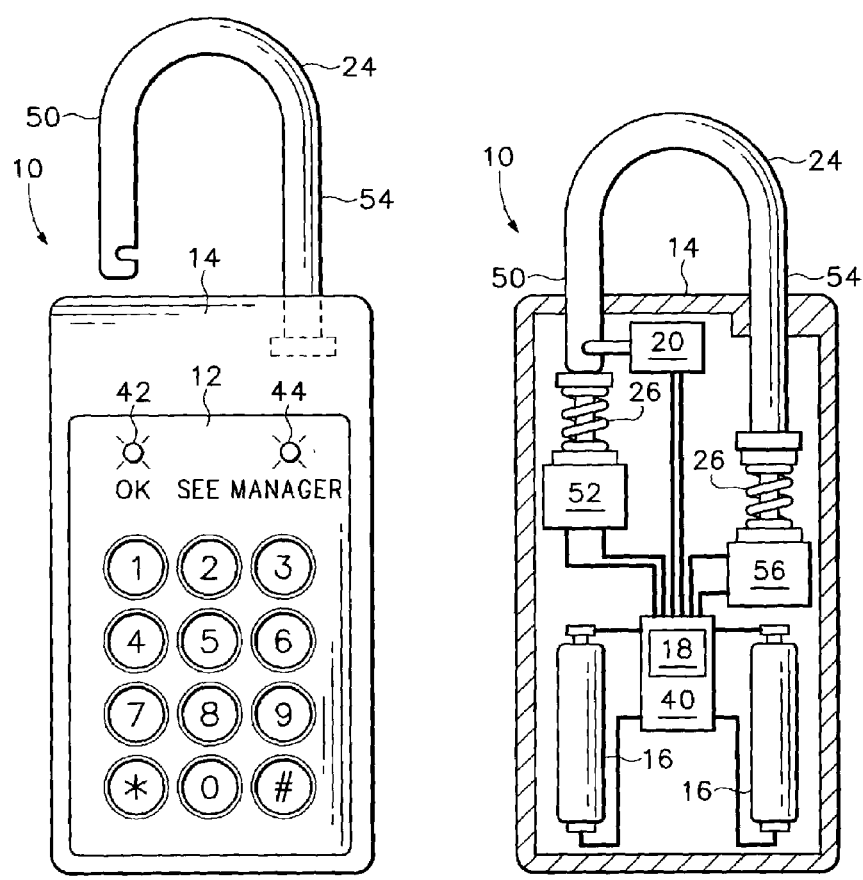

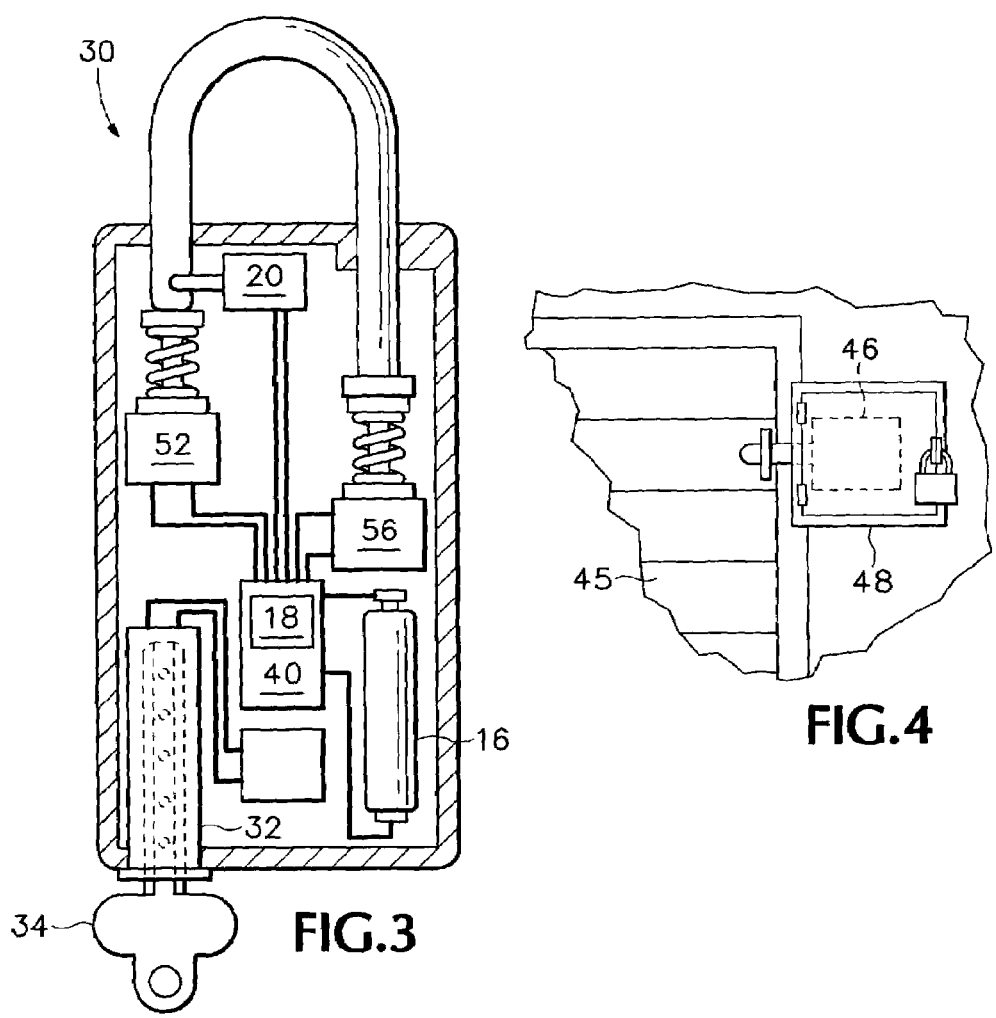
FIG.3
FIG.4
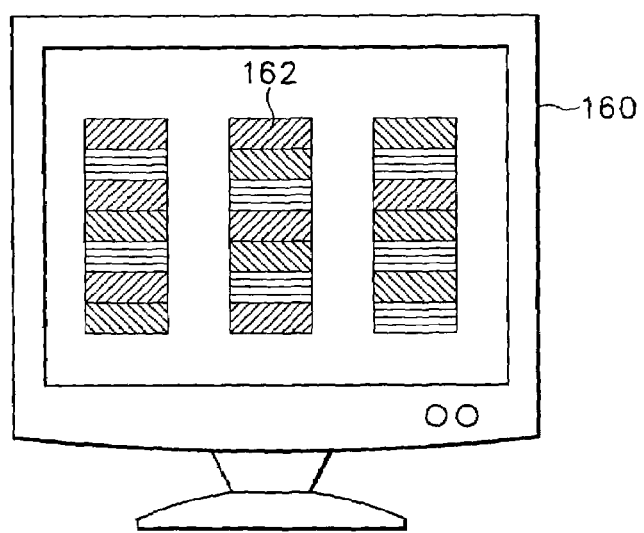
FIG.5

LOCK WITH REMOTELY ACTIVATED LOCKOUT FEATURE

BACKGROUND OF THE INVENTION

Self-storage units, in the United States, are typically rented on a monthly basis with the rent for each month being due on the first day of that month. If the rent is not paid by the tenth day of the month, the owner of the facility gains the legal right to lock out the renter, so that the renter no longer has access to the storage unit. Accordingly, on the eleventh day of each month, the manager of a self-storage facility typically has the task of walking around the facility and over locking all of the units for which the renter of the unit has not paid his rent for the current month. This is done by placing an additional lock on the storage unit door, through a hasp specially set for this purpose. For a large facility with hundreds of storage units this task can take two to four hours.

Another characteristic of self-storage facilities is that they are typically fenced and gated. The gate is controlled by a keypad that is linked to a computer. Each renter is associated with a key sequence that the renter enters into the keypad in order to enter and exit the facility. The computer notes the renter's presence in the facility. The computer to which the keypad is linked typically runs a computer program specially designed for facilitating the management of a self-storage facility. When a renter pays his or her rent, this information is logged into the computer. Accordingly, on the eleventh day of the month it is a simple matter to obtain a list of unit numbers for which the rent has not been paid.

Although self-storage unit renters are typically careful to secure their goods, in a large facility with hundreds of renters there are likely to be a fair number of instances, every month, of a renter forgetting to lock his unit when he has completed his tasks at the facility and is prepared to leave. This, of course, leaves the storage unit vulnerable to thievery. Every instance of thievery lowers the reputation of the facility and results in a certain amount of extra work for the manager.

It is an unfortunate truth of the self-storage industry that some facility managers engage in thievery. Although the tenant places his own lock on a unit, a manager may be quite knowledgeable about locks and may know how to pick a lock, or even have another key that works for the lock, in his collection of locks and keys that are used for over locking units. Accordingly, many renters would appreciate some additional assurance that their goods are safe from a thieving manager when locked in the storage unit.

Thieves that break into storage lockers by cutting off the lock constitute another problem for storage facility owners, operators and renters. Addressing this problem, locks that include an alarm mechanism that makes an audible sound or transmits a radio frequency signal are known in the prior art. There could be a problem in the use of these locks in a facility with hundreds of locked units, however, because it would not be immediately evident which lock was producing the alarm signal.

Another problem encountered in the self-storage industry is that of renters losing their keys. Because a key to a rental unit is not an item that would typically be used on an everyday basis, many renters may place this key in a location that is subsequently forgotten. When this happens, the lock must be cut off the storage unit, creating more work for the facility manager and an unwanted expense to the renter.

SUMMARY OF THE INVENTION

In a first, separate aspect, the present invention is a method for controlling access to a storage unit owned by an owner, wherein a renter has access to the storage unit unless the owner receives the legal right to deny the renter access to the storage unit and decides to do so. In this method, the storage unit is secured by a lock that is, at least in part, controlled by the renter. A remotely controllable lockout assembly, however, is capable of over locking the storage unit so that the renter can no longer gain entry when the lockout assembly is activated. The method includes remotely controlling the lockout assembly to deny the renter access to the unit when the owner receives the legal right to deny the renter access to the storage unit and decides to do so.

In a separate second aspect, the present invention is a lock with a remote lockout feature. The lock includes a body and a locking element that is retained by the body when the lock is in a locked state and which may be at least partially released from the body to place the lock in an unlocked state. In addition, a locking actuator is adapted to be physically manipulated by a user to place the lock in a locked state and, alternately, an unlocked state. Finally, a lockout actuator includes a signal receiver, a code detector electrically connected to the signal receiver and a lockout element, responsive to the code detector to place the lock in a lockout state, preventing the locking actuator from placing the lock in an unlocked state and alternately to place the lock in a user controlled state, which permits the locking actuator to place the lock in an unlocked state.

In a third separate aspect the present invention is a lock system that includes a lock that opens in response to an opening stimulus and includes a remote signal receiver. In addition a remote station is capable of sending a signal to the lock to change the opening stimulus.

In a fourth separate aspect the present invention is a security system that includes a plurality of alarm locks, each of which includes an alarm mechanism capable of detecting a breakage of the lock and creating an alarm indication. In addition an alarm transmitter is responsive to the alarm mechanism and capable of transmitting an alarm signal in response to an alarm indication from the alarm mechanism. Each of the locks includes in its alarm signal an identifying sequence that is substantially unique relative to the identifying sequences of all the other alarm locks.

The foregoing and other objectives, features and advantages of the invention will be more readily understood upon consideration of the following detailed description of the preferred embodiment(s), taken in conjunction with the accompanying drawings.

BRIEF DESCRIPTION OF THE DRAWINGS

FIG. 1 is a front view of a preferred embodiment of a lock according to the present invention.

FIG. 2 is an interior view of the lock of FIG. 1.

FIG. 3 is an interior view of an alternative preferred embodiment of a lock according to the present invention.

FIG. 4 is an illustration of a storage unit locking apparatus that comprises a portion of a preferred method of the present embodiment.

FIG. 5 is an illustration of a computer monitor display that shows graphics for programming and monitoring a storage facility, according to one aspect of the present invention.

DETAILED DESCRIPTION OF THE PREFERRED EMBODIMENTS

Figure 6:
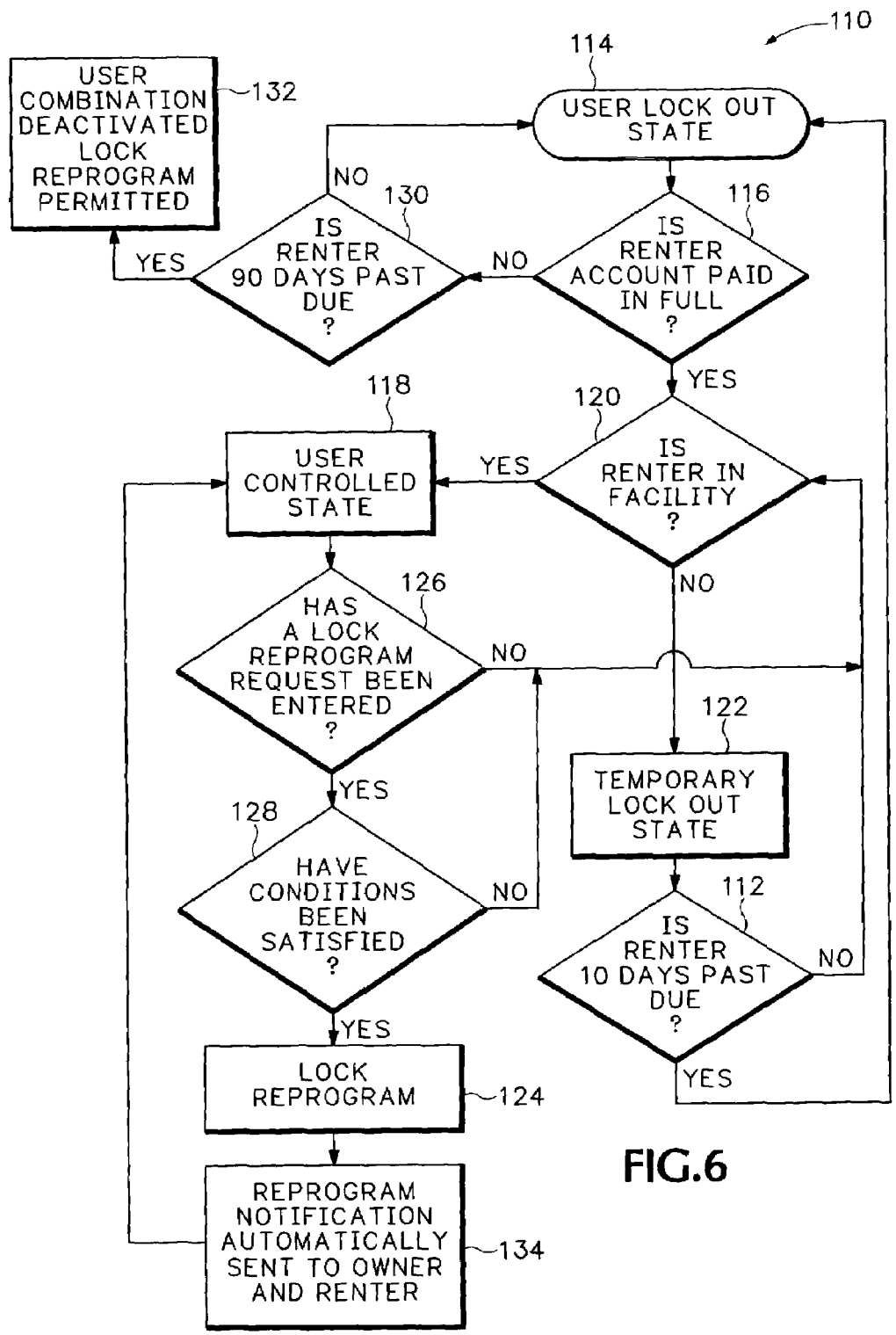
FIG. 6 is a flow diagram that describes, at least in part, a preferred method of the present invention.

Referring to FIGS. 1 and 2, a first preferred embodiment of the present invention takes the form of a combination lock 10, having a keypad 12, on the face of a lock body 14, adapted to accept and recognize a combination entered by a user. Keypad 12 is preferably a water-tight membrane dome type. The recognition task requires electric power, which is provided by a pair of batteries 16. If the entered code matches a set code in a logic mechanism 18 and if the lock is in user controlled state (see below), a solenoid 20 retaining a shackle 24 is placed in a state that permits shackle 24 to be pulled outwardly from body 14, thereby freeing a shorter leg 50 of the shackle 24. Springs 26 urge the shackle 24 upwards into an open state. In a second preferred embodiment the lock (FIG. 3) is an electronic key lock 30 that uses a magnetic key reader 32 to read a magnetically encoded key 34. The following disclosure applies to lock 30 as well as lock 10 with all references to a "combination" modified to refer to a key 34.

As noted in the Background section, most self-storage facilities are operated on a month-to-month rental basis. Rent is typically due on the first of each month and in most American states, if the renter has failed to pay by the tenth day of the new month, the owner of the facility receives the right to deny the renter access to her storage unit. To facilitate this denial of access, the lock 10 of the present invention includes an automatic lockout feature. A radio frequency (RF) transceiver 40, inside lock 10 is capable of receiving a coded message that places the lock 10 in a lockout state, wherein lock 10 remains locked even if the correct combination is entered into the keypad 12 and received by logic unit 18. If the lock 10 is in lockout state, the user, upon depressing any keypad key, is advised by a red light 44 that the lock 10 is in the lockout state and that he should see the facility manager, rather than attempting to unlock the lock 10. After the combination is entered a green light 42 advises the renter that the lock 10 is open.

Referring to FIG. 4, in a separate preferred embodiment, the remotely controlled lockout system is implemented by a separate, remotely controlled, door lock 46. For example, a mechanism could be provided on the inside of a storage unit door 45 that could be automatically activated to prevent the door from opening. One advantage of having the lockout unit 46 placed inside the storage unit is that unit 46 could receive electrical power from the same source that powers the storage unit interior light. A separately lockable small door 48 could provide exterior access to unit 46.

Currently, several computer programs are available for facilitating the management of a self-storage facility by, for example (see FIG. 5), displaying a map 160 of the facility with each unit 162 color coded to indicate its status, ie, whether the unit is rented out, whether the rent has been paid for month, etc. When a renter pays her rent for the month, this information is entered into the program and is immediately available. Referring to FIG. 6, which shows a flow chart of the remote station system logic 110, the computer automatically places in lockout state all of the units for which rent is delinquent (decision box 112, leading to lock out state block 114). When the renter subsequently pays her rent (decision box 116), the lockout state is changed to a user controlled state (state block 118), for as long as the renter is in the facility (decision box 120). Whenever the renter is not in the facility (as indicated by the gate entrance and exit keypads) the lock 10 is placed in a temporary lockout state (state block 122).

In a preferred embodiment, the lock 10 transmits a signal to the remote station. Every lock 10 sends a unique identifying code every time it communicates with the remote station, so that the remote station can associate the communication with the storage unit and renter. In one use of this lock 10 transmit capability, a message is sent advising the remote station when the lock 10 has been placed in an unlocked state and when it has then been placed into a locked state. If a unit is unlocked when the renter enters his keypad combination to leave the facility, he is automatically notified of this condition so that he can return to relock his unit.

Lock 10 also has an alarm feature. A short arm 50 of shackle 24 touches a short arm switch 52 and a shackle long arm 54 touches a long arm switch 56. If both switches are opened, no alarm is given because this is a normal open state condition. But if the long arm switch 56 is opened while the short arm switch remains closed, then the shackle must have been cut (long arm 54 is urged outwardly by the spring action of switch assembly 52). In response an RF alarm signal, including the unique lock identifying code, is sent to the remote station.

Sometimes renters forget the combination, or in the case of a key lock, lose the key 34. In addition, there may be unforeseeable emergency reasons for needing to enter a storage unit, or the local police may serve a search warrant for a rental unit. In the past any such occurrence has typically resulted in the lock shackle being cut and a new lock being placed on the unit door. With lock 10, however, a new combination may be uploaded into lock 10 from the remote location by radio frequency (FIG. 6, block 124), thereby sparing the facility manager from the task of walking to the storage unit and cutting off the lock. In one preferred embodiment a request for a lock reprogramming (decision box 126), must be followed up with some evidence to show that the renter has approved the request (decision box 128, see below). The reprogram feature could also be used to enable the facility manager to enter the unit in the event that the renter is so far behind in his rent payments that the owner has received the legal right to gain entry to the unit for the purpose of initiating sale of the renters possessions, in lieu of receiving rent payment (decision box 130). In this event, reprogramming would be permitted and the renter's combination would be deactivated (block 132).

The remote station's ability to change the combination to a lock 10 raises the possibility of a thieving manager changing the combination to a lock 10 for the purpose of being able to open the lock 10 and stealing unit contents. There are, however, a few natural safeguards against this sort of system abuse, as well as a few extra preventative measures that could be taken.

First, as each lock 10 is affirmatively over locked during facility closed times, the manager would have to enter the unit while the storage facility was open, potentially drawing attention to himself. Second, if the facilities manager were to change the lock combination for the purpose of illicitly entering the unit, he would have no way of knowing the renter's combination, so he would have no way of placing the lock 10 back into its original state. The tenant would then be unable to enter his unit and would realize that something was amiss.

Moreover, a log of all lock 10 activities is maintained at a secure location, so that it is unalterable by the facility manager. In one embodiment, one such log is maintained in the lock 10 itself. In yet another embodiment an Email or a page is automatically sent to both the owner and the renter (block 132) any time a lock 10 is reprogrammed to accept a new combination. If the renter has requested and or performed the reprogramming, this notice would come as no surprise and would not cause alarm. If the facility manager had reprogrammed the lock 10 without the renter's permission, however, the renter would likely invoke an investigation that would snare the thieving manager.

As an extra safeguard, in a preferred embodiment, biometric data would be required for changing the key combination. For example, a finger print reader could be used to identify the renter. Alternatively, at the time of rental the renter enters into the computer a question and answer, such as, "what is the name of my dog," "Charlie." Any lock combination reprogram request is met with the question entered. If the correct answer is not entered into the computer in response, the lock 10 combination can not be changed. If the renter adequately identifies himself to the computer system, however, the now familiar ritual of cutting off a lock for which the key has been lost would no longer be necessary, saving time for both the renter and the facility manager. The renter need simply reprogram the lock from the remote station and then travel to the lock to apply the new combination.

Many advantages of the lock 10 of the present invention should now be apparent. Using this lock, a storage facility can be converted to a facility in which every unit is alarmed, without the costly installation of a great number of alarm sensor and transmission units. Time is saved whenever it is necessary to lock renters out of their units, or to permit renter access after the rent has been paid. Any instance of an accidentally unlocked unit is brought to the attention of the facility manager. Because the locks are affirmatively over locked during periods when the facility is closed, a thieving manager would have to ply his trade during daylight hours. In order to provide these manifold advantages, however, lock 10 must be supplied with electric power. Batteries 16 are necessary for this purpose and the possibility of the batteries running down completely are anticipated in the embodiments. In one embodiment, a low power detector is included in the lock, and a signal, including an identification of the lock, is broadcast when a low battery condition is detected. In a related embodiment, if the batteries are permitted to run down, the lock 10 will remain in a locked state, unable to receive input from the key reader or keypad. The combination is stored in nonvolatile memory (typically electrically erasable programmable read only memory [EEPROM]), however, so that after the batteries have been replaced, the lock 10 may again be opened with the same combination as before.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. A method for controlling access to a storage unit owned by an owner, wherein a renter can obtain and maintain rights to said storage unit by paying a first rental fee and subsequent periodic rental fee payments according to a schedule, said method comprising:

(a) providing a lock, controllable at least in part by said renter, securing said storage unit;

(b) said lock having a remotely controllable overlock feature so that it can be placed in an overlock state by remote control; and (c) remotely controlling said lock to deny said renter access to said unit when said renter has failed to pay said periodic rental fee on schedule and a grace period has passed since said renter's rights to said storage unit have elapsed.

2. The method of claim 1, wherein said storage unit is one out of a multiplicity of storage units all located in a gated storage facility and all being provided with a lock having a remotely controllable overlock feature and wherein managing said gated storage facility is facilitated by a computer running a computer program and wherein said computer running said computer program separately controls each said lock.

3. The method of claim 2, wherein rent payments are entered into said computer running said computer program and wherein said computer program is set to control each said padlock to deny renter access after a fixed grace period has elapsed since nonpayment of rent according to said schedule, said owner having decided in advance to over lock each unit after said fixed grace period elapses.

4. The method of claim 3 wherein said lock is a combination lock having a combination and wherein said computer can be commanded to change said combination and is additionally configured to contemporaneously issue an advisory Email as a safeguard against a dishonest manager.

5. The method of claim 3 wherein said lock is a combination lock having a combination and wherein said computer can be commanded to change said combination and is additionally configured to contemporaneously enter said change of said combination into a permanent log, as a safeguard against a dishonest manager.

6. The method of claim 2, wherein access to said gated storage facility is controlled by a gate that can be opened by each renter by way of entering a secret code into a keypad and wherein each renter entry and exit is reported to said computer running said computer program and wherein said units are maintained in a lockout state unless said computer has been notified that a corresponding renter has opened said gate and has not yet left said gated storage facility.

7. The method of claim 1 wherein said lock is a padlock.

8. The method of claim 1 wherein said lock is wirelessly remotely controllable.

9. The method of claim 1 wherein said lock is remotely controllable by a radio frequency (RF) signal.

10. The method of claim 1 wherein said grace period is 5 days.

11. The method of claim 1 wherein said grace period is 10 days.

12. The method of claim 1 wherein said periodic rental fee is a monthly rental fee.

13. The method of claim 12 wherein said monthly rental fee is due on the first day of every month.

* * * * *